US008565815B2

(12) United States Patent
Rhoads et al.

(10) Patent No.: US 8,565,815 B2
(45) Date of Patent: *Oct. 22, 2013

(54) METHODS AND SYSTEMS RESPONSIVE TO FEATURES SENSED FROM IMAGERY OR OTHER DATA

(75) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1211 days.

This patent is subject to a terminal disclaimer.

(21) Appl. No.: 11/941,268

(22) Filed: Nov. 16, 2007

(65) Prior Publication Data
US 2008/0300011 A1 Dec. 4, 2008

Related U.S. Application Data

(63) Continuation-in-part of application No. 11/670,841, filed on Feb. 2, 2007, now Pat. No. 7,715,446.

(60) Provisional application No. 60/866,198, filed on Nov. 16, 2006.

(51) Int. Cl.
*H04M 1/00* (2006.01)

(52) U.S. Cl.
USPC ............... 455/556.1; 455/557; 455/550.1; 455/566; 382/115; 382/116; 382/119; 382/124

(58) Field of Classification Search
USPC ............ 455/556.1, 566, 550.1, 556.2, 557; 382/115–116, 119, 124
See application file for complete search history.

(56) References Cited

U.S. PATENT DOCUMENTS

| | | |
|---|---|---|
| 5,822,436 A | 10/1998 | Rhoads |
| 6,064,737 A | 5/2000 | Rhoads |
| 6,111,954 A | 8/2000 | Rhoads |
| 6,252,963 B1 | 6/2001 | Rhoads |
| 6,278,781 B1 | 8/2001 | Rhoads |
| 6,438,231 B1 | 8/2002 | Rhoads |
| 6,751,320 B2 | 6/2004 | Rhoads |
| 6,968,057 B2 | 11/2005 | Rhoads |
| 7,103,197 B2 | 9/2006 | Rhoads |
| 7,113,596 B2 | 9/2006 | Rhoads |
| 7,116,781 B2 | 10/2006 | Rhoads |
| 7,362,781 B2 | 4/2008 | Rhoads |
| 7,522,728 B1 | 4/2009 | Rhoads |
| 7,702,673 B2 * | 4/2010 | Hull et al. ...................... 707/707 |
| 7,715,446 B2 | 5/2010 | Rhoads |
| 7,720,436 B2 * | 5/2010 | Hamynen et al. ............ 455/13.1 |
| 2001/0010730 A1 | 8/2001 | Rhoads |
| 2002/0147910 A1 * | 10/2002 | Brundage et al. ............. 713/176 |
| 2003/0021441 A1 * | 1/2003 | Levy et al. .................... 382/100 |
| 2003/0040326 A1 | 2/2003 | Levy et al. |
| 2004/0022444 A1 | 2/2004 | Rhoads |
| 2004/0181671 A1 * | 9/2004 | Brundage et al. ............. 713/176 |
| 2006/0190812 A1 * | 8/2006 | Ellenby et al. ................ 715/512 |
| 2007/0162942 A1 * | 7/2007 | Hamynen et al. ............ 725/105 |
| 2008/0125083 A1 | 5/2008 | Rhoads |
| 2008/0268876 A1 * | 10/2008 | Gelfand et al. ............... 455/457 |
| 2008/0293381 A1 | 11/2008 | Rhoads |
| 2009/0116683 A1 | 5/2009 | Rhoads |

FOREIGN PATENT DOCUMENTS

| | | |
|---|---|---|
| EP | 0 921 675 | 6/1999 |
| GB | 0 351 960 | 6/1931 |
| JP | 11-232286 | 8/1999 |

OTHER PUBLICATIONS

U.S. Appl. No. 09/818,533, filed Mar. 28, 2001, Geoffrey B. Rhoads.
U.S. Appl. No. 09/986,170, filed Nov. 7, 2001, Geoffrey B. Rhoads.
EP Communication issued in European Patent Application No. 02744779.6 and dated Nov. 19, 2010.
Notice of Decision of Final Rejection issued in Korean Patent Application No. 10-2010-7007176 and dated Dec. 30, 2010.
Notice of Reasons for Rejection issued in Japanese Patent Application No. 2001-552328 and dated Sep. 28, 2010.
Office Action issued in Canadian Patent Application No. 2,483,419 and dated Sep. 29, 2010.

* cited by examiner

*Primary Examiner* — Fayyaz Alam

(57) ABSTRACT

A device, such as a cell phone, uses an image sensor to capture image data. The phone can respond to detection of particular imagery feature (e.g., watermarked imagery, barcodes, image fingerprints, etc.) by presenting distinctive graphics on a display screen. Such graphics may be positioned within the display, and affine-warped, in registered relationship with the position of the detected feature, and its affine distortion, as depicted in the image data. Related approaches can be implemented without use of an image sensor, e.g., relying on data sensed from an RFID device. Auditory output, rather than visual, can also be employed. A variety of other features and arrangements are also detailed.

15 Claims, No Drawings

METHODS AND SYSTEMS RESPONSIVE TO FEATURES SENSED FROM IMAGERY OR OTHER DATA

RELATED APPLICATION DATA

This application is a continuation-in-part of application Ser. No. 11/670,841, filed Feb. 2, 2007, and also claims priority benefit to provisional application 60/866,198, filed Nov. 16, 2006.

The subject matter of the present application is related to that disclosed in the assignee's application Ser. Nos. 11/740,140, filed Apr. 25, 2007; 11/739,387, filed Apr. 24, 2007; 11/675,461, filed Feb. 15, 2007 (now published as US20070201720); 11/625,125, filed Jan. 19, 2007 (now published as US20070187505); and the assignee's U.S. Pat. Nos. 5,822,436, 6,064,737, 6,278,781, and 6,614,914.

TECHNICAL FIELD

The present technology relates to methods and systems for sensing certain features from imagery or other data, and for responding are same.

SUMMARY

The prevalence of mobile telephone devices with high quality imaging and display systems (including, e.g., camera phones, PDAs, iPhones, Blackberries, etc.—generally referred to as "cell phones" in the discussion that follows) offers a variety of opportunities for enhancing electronic interactions with objects.

One aspect of the present technology is a method of using a cell phone device that includes a processor, a display, and an optical system (including a 2D image sensor and a lens). The method includes capturing image data corresponding to a field of view that encompasses at least part of an object. One or more features associated with the object is then recognized from the image data and, as a consequence, a graphic feature is presented on the cell phone device display, together with at least some of the captured image data.

The recognized feature can comprise steganographically encoded information (e.g., a digital watermark), an image fingerprint (e.g., an image hash), a bar code or other machine-readable encoding, a directional albedo pattern, a data-encoded texture pattern, etc.

The graphic feature presented on the screen can be determined in accordance with the object feature sensed from the image data, e.g., by indexing a local or remote data store. The graphic may be comprised of component primitives that are selected or controlled—in color or location—based on the recognized object feature data. Similarly, a logo, graphic, border, animation, or display instructions can be looked-up in the data store, and used in presenting the graphic on the display screen.

In some arrangements, the position of the graphic feature on the screen depends on the position of the object within the cell phone's field of view. Affine distortion of the imaged object within the field of view may be determined, and the graphic presented on the screen can be similarly distorted. (Distortion can be determined, e.g., by reference to edges of a rectangular object, by subliminal registration signals conveyed by a digital watermark, or by other means.) By such arrangements, the presented graphic can be spatially registered with the underlying image data.

Such method can employ a cell phone with a GPS receiver, in which case the graphic feature may also depend—at least in part—on location data from the GPS receiver.

In another aspect, a method employs a cell phone with an audio transducer. Image data corresponding to an object is captured, and processed to recognize one or more non-text features associated with the object. The method then provides auditory output through the audio transducer, dependent at least in part, on the recognized feature(s).

Another aspect of the technology is a method for determining apparent validity of a printed article, such as a driver's license. The method includes imaging the article with a cell phone, processing resultant image data to detect a feature from the article, and signaling apparent validity of the printed article based on detection of said feature. The signaling can be effected by presenting a combined display on the screen of the cell phone, including at least some of the image data corresponding to the article, and graphical indicia indicating that the article is apparently valid.

Yet another aspect of the technology is a cell phone including a processor, a display system, and an optical system (including a 2D image sensor and a lens), in which the cell phone processor is adapted to process still image data captured by the optical system to derive corresponding image fingerprint data therefrom (e.g., by one of any known image fingerprinting or "robust hashing" algorithms).

Such a cell phone desirably includes a wireless interface adapted to transmit the fingerprint data from the phone, and to receive corresponding metadata in reply. The display system of the phone is adapted to present on a cell phone screen a combined display including at least some of said captured image data, and also including graphical indicia corresponding to the obtained received metadata. Desirably, although not essentially, the graphical indicia is displayed on the screen in a location that depends on position of an object feature within a field of view of said cell phone optical sensor.

Still another aspect of the present technology is a method involving a mobile telephony device having a processor, a display, and an optical system (including a 2D image sensor and a lens). The method includes sensing plural-bit data from an RFID chip, and presenting imagery on the display of the mobile telephony device, based on image data captured by the optical system, where the presentation of said imagery depends in some manner on the sensing of data from the RFID chip (e.g., it may have a graphic feature dependent on the RFID data overlaid on the presented image data).

Yet another aspect of the present technology is a method involving a mobile telephone device having a processor, a display, and an optical system (including a 2D image sensor and a lens). The method includes presenting imagery on the display of the mobile telephony device, based on the sensed image data, and deriving fingerprint data from at least some of the image data. In such arrangement, presentation of said imagery depends in some manner on the derived fingerprint data (e.g., a database of reference fingerprint information may be searched, and corresponding data may be returned to the cell phone and used to define a graphic feature that is overlaid on the presented image data).

Still another aspect of the present technology is a method involving a mobile telephone device having a processor, a display and an optical system (including a 2D image sensor and a lens). The method includes determining an apparent affine transformation of an object represented in the image data, warping a graphic in accordance with said determined transformation, and displaying the warped graphic on the display. (Although not essential, the warped graphic may be displayed together with at least some of the image data.)

Yet another aspect of the present technology is an apparatus including a 2D optical sensor, a display screen, and a processor. The processor is operative to detect a particular class of feature in image information captured by the optical sensor, and, in response to such detection, to cause the display screen to modify presentation of at least some of said captured image information by presenting a graphic feature therewith. (The class of feature may be, without limitation, a barcode, a steganographic image watermark, or an image fingerprint.)

In one particular arrangement, the feature is printed text, which is OCR-processed by the processor to yield alphanumeric data. Such data can be converted to text symbols and presented on the screen, or it can be used to index a data store from which other data is obtained, and that other data serves to determine a graphic feature presented on the screen.

DETAILED DESCRIPTION

Consider an object (e.g., a magazine advertisement, a product package, an automotive part, a pharmaceutical tablet, a driver's license, etc.) that conveys a digital watermark signal, and is imaged by the imaging system of a mobile device. Upon detection of a steganographic marking in image data captured by the imaging system, the device's image processing/display system superimposes a characteristic marking on the object as presented to the user on the device's screen. In one embodiment, graphic sprites—such as sparkles or fireworks or an animated character—are overlaid on the image. "Blitting" of the image display buffer with the overlay data is one approach by which this effect may be achieved.

The graphic overlay can be placed—in the displayed image—in registered alignment with the watermark on the imaged object. For examples, sparks can be made to shoot out from a watermarked corporate logo. Or a flashing yellow oval can be made to appear around a watermarked pharmaceutical tablet.

Correct registration of the graphic overlay, and affine transformation of the overlay to properly match the apparent distortion of the object as viewed by the imaging system, can be accomplished by reference to a calibration signal sensed from the steganographic watermark. Such calibration signal can be in addition to a plural-bit auxiliary data signal encoded by the watermark, or may be present without any auxiliary data.

Steganographic calibration signals by which affine distortion of an imaged object can be accurately quantified are detailed, e.g., in U.S. Pat. Nos. 6,614,914 and 6,580,809; and in publications US20040105569, US20040101157, and US20060031684. U.S. Pat. No. 6,959,098 teaches how distortion can be characterized by such watermark calibration signals in conjunction with visible image features (e.g., edges of a rectilinear object). From such affine distortion information, the 6D location of the watermarked object (x, y, z, tip, tilt, rotation) relative to the mobile phone's imager can be determined. The calibration signal(s) detected from the imagery can serve as a graphic framework relative to which the overlayed features can be positioned.

In other embodiments, the special effects presented with the imaged portion of the object can be aligned by reference to visible features of the object—such as its edges, or margins. Or, in simpler embodiments, the overlaid special effects aren't particularly warped in correspondence with the object. Nor do they even need to be positioned in correspondence with the object's position in the displayed image data.

Technology for identifying a watermarked excerpt within an image frame is detailed in published application 20050160271.

Viewing a steganographically-marked object through use of a device such as detailed herein is akin to viewing an object marked by ultraviolet-responsive ink under ultraviolet illumination—it allows the user to perceive additional features that are not otherwise visible. However, in this case, at least some of the additional features are added (e.g., by the cell phone), in response to detection of steganographic features.

This arrangement can be used as a visual check of object authenticity (assuming the correct steganographic marking is found only on genuine objects). Authentic objects trigger a special response when imaged by such an imaging device.

The particular graphic that is overlaid onto the screen can have many different forms. A simple example is a yellow oval—either sized to surround the watermarked object in the display, or bordering the edge of the display (regardless of where the watermarked object is within the field of view). Another example is a logo—either centered on the watermarked object, or at a fixed location on the screen. The displayed graphic may incorporate movement—such as an animated arrow or dashed line that dynamically circles around the watermarked feature presented in the display. (The displayed feature may be comprised of one or more graphic primitives, stored either in the cell phone or at a remote server, which are assembled to yield a composite graphic.)

The foregoing examples may be triggered responsive to detection of any watermark. In other cases, the response may be dependent on particular payload bits discerned from a watermark. For example, the sensed watermark may convey 8 or 16 bits of data, by reference to which the displayed feature may be customized (e.g., color, location on the screen, component primitives, etc.) This customization can be performed by the cell phone processor, or by a remote server.

In still another example, the payload bits discerned from the watermark can be used to look-up logos, graphics, animations, or instructions stored in the cell phone memory. In a related example, the payload bits can be used to look-up such information in a remote data structure (e.g., by HTTP protocol and interchanges), which data structure may be accessed wirelessly (e.g., PCS, WiFi, WiMax, Bluetooth, EVDO, etc.).

In one particular arrangement, the decoded watermark payload serves as an index to a remote web server that returns a graphic that is to be overlaid on the sensed object. A watermarked Nike logo, for example, may correspond to a textual overlay "Just Do It!"

A displayed graphic can also provide textual user instructions, e.g., informing the user as to what buttons on the device can be operated to trigger different operations. The watermark in a print advertisement for the Los Angeles Galaxy soccer team, showing a picture of soccer player David Beckham, can trigger display of an overlay such as "Press 1 to see the Beckham video clip; Press 2 to buy tickets to Friday night's game," etc.

In addition, or alternatively, the action triggered in response to detection of the watermark can be one that corresponds in some way to (e.g., is dependent on) data available at the device. For example, the rendered response can be tailored in accordance with a user ID, age, screen orientation, screen resolution, GPS-determined geographic location, etc.

The overlay introduced on the device display in response to detection of the marking may be translucent (i.e., some representation of the underlying object may be visible through the overlay), or the overlay may be opaque (i.e., fully obscuring the object, hidden beneath).

The watermark payload may also index a corresponding piece of software code (e.g., stored on a remote server), which is executed on the cell phone processor when the watermark is detected. Execution of this code can again employ local data stored in the cell phone's memory, e.g., permitting customization of the executing code to the particular device/user/context.

Published application 20070192352 has a great deal of information about how an identifier extracted from an object can be used to link to a large repository of related information (meta-data). Such methods and systems are well suited for use with the presently-described technologies. (Likewise, the technologies detailed herein can be used in embodiments of the '352 application.)

In some embodiments, several different actions may be taken, in a sequence, when a watermarked object is viewed by the imager. For example, as soon as any watermark has been detected, the phone can present a distinctive chime, or can display an introductory graphic/animation—signaling to a user that something special is underway. This can happen very quickly (e.g., simply by detecting presence of a watermark calibration signal)—without any remote data exchanges. Then, once the watermark has been decoded and plural payload bits are available (which decoding may be performed locally, or by transmitting image-related data to a remote server which performs the decoding), a response particularly corresponding to the decoded payload can be presented.

The cell phone's action in response to detection of a watermarked excerpt in a frame of captured image data can also depend on input provided by the user. In one case the input takes the form of cell phone motion. For example, if the cell phone is held still while viewing a watermarked object, a static overlay may be presented on the screen (e.g., a yellow rectangle), whereas if the cell phone is moved while viewing the object, a dynamic overlay may be presented (e.g., fireworks shooting from the object as it moves). In another arrangement, if the cell phone is moved so the watermarked object moves up and down in the display, a first type of response can be triggered. A different response can be triggered by moving the cell phone (or the object) side to side, or in a figure-eight pattern. Etc. (Gestural interaction by cell phones is further detailed in U.S. Pat. No. 6,947,571.) The input can also be provided through different user interface mechanisms, such as the cell phone keypad, touchpad, voice recognition, fingerprint or other biometric detection, etc. The different response invoked by user input can serve to tailor the graphic overlaid on the display. Additionally, or alternatively, it can trigger other cell phone responses, such as providing a password to a password-protected resource, e.g., a bank account, or Facebook or MySpace web page.

U.S. Pat. No. 6,947,571 details a great variety of responses that can be triggered by detection of a watermark signal. Some of these are dependent on location data obtained by a GPS-equipped cell phone. Each of those arrangements can be adapted to the present context, e.g., with the response taking the form of an overlay (translucent or not) presented on the cell phone display. Other techniques and arrangements detailed in the '571 patent can likewise be employed in the present arrangements (and, conversely, technologies detailed herein can be incorporated into arrangements detailed in the '571 patent).

In some embodiments, the mobile device may have a distinct operational mode in which it responds in the foregoing manners when a watermarked object is sensed. This mode can be turned on and off by the user. In other embodiments, the device is always on the lookout for a watermarked object (e.g., interrogating images for watermarks), and ready to present extra graphics—or other responses—whenever such an object is sensed. (In the former embodiment, the cell phone can present an "invalid" pattern on the screen unless/until a watermarked object is imaged. One "invalid" pattern is the word NO superimposed across the screen. Another is a red circle with a diagonal line through it.)

Cell phones and like devices commonly use CCD or CMOS image sensors that include red, green and blue sensing elements arrayed in a "Bayer" pattern. By knowledge of the sensor configuration, the steganographic encoding pattern may be optimized for detection by the thus-configured sensor. An object marked with such a watermark may—as it is moved closer to the sensor, suddenly strobe, or be given another distinctive graphical effect—when its Bayer-encoding registers with the Bayer encoding of the cell phone sensor.

The features that trigger the cell phone to present distinctive graphics with the imaged object need not be steganographic. Overt image features that signal a particular object (e.g., a valid pharmaceutical package) can also be sensed from the image data by the device processor and—if detected—the distinctive graphics may be applied. One class of such visible features is detailed in U.S. Pat. No. 6,871,789.

Still further, such features may be caused to be overlaid on a screen display in response to detection of other, non-image, data. An example is detection of a signal from an RFID chip (the signal is regarded as a "feature"). As above, the particular overlay graphic presented on the display can be determined by reference to the payload data conveyed by such chip. Or a generic response can be triggered regardless of the particular data conveyed.

While the foregoing discussion has focused on steganography, a signal can also be represented (hidden, or not) through other means. Barcodes and OCRs are familiar examples. Image "fingerprints" are others (e.g., recognizing a Coke or Nike logo by its distinctive shape, color, robust image hash or signature, and/or other characterizing feature(s)). Publication US20060240862 to Neven illustrates that several recognition techniques can be used in parallel (e.g., barcode, facial recognition, etc.) Still other types of signals are detailed in published application US20070187505. Such techniques may be used to glean an identifying signal from an object (e.g., a driver license) and—if detected—such signal can trigger presentation of a display on the cell phone screen (e.g., one that visibly signals that the license appears to be valid). Thus, watermarking is not essential.

(Particular techniques for pattern recognition and for computing fingerprints from images and other content signals are disclosed in the present assignee's U.S. Pat. Nos. 7,020,304, 7,151,854, 7,289,643, US20030012548, US20030021441, US20040091111, US20060031684, US20070091376, US20070162761, US20070174059, and application Ser. No. 11/697,610, filed Apr. 6, 2007. Fingerprinting technology is also taught, e.g., in Haitsma, et al, "A Highly Robust Audio Fingerprinting System," Proc. Intl Conf on Music Information Retrieval, 2002; Cano et al, "A Review of Audio Fingerprinting," Journal of VLSI Signal Processing, 41, 271, 272, 2005; Kalker et al, "Robust Identification of Audio Using Watermarking and Fingerprinting," in Multimedia Security Handbook, CRC Press, 2005, and in patent documents US20020178410, US20060075237, US20050259819, and US20050141707.)

The action triggered in response need not take the form of a graphic overlay. Other responses are also contemplated, such as vibration, chimes, spoken words, flashing indicator LEDs, etc.

It may be recognized that any publicly deployed "detector" of a signal (regardless of channel) that generates a binary result ("Signal" vs. "No Signal") creates something of an oracle for attack. If, instead, the pattern matching, error correction and/or ultimate Yes/No answer is generated by the end user—not the device—this threat would be mitigated. In this modality, the device simply becomes an electronic replacement for an aid such as a magnifying glass. An example of such a system would be a device (e.g., a cell phone) that upon imaging a feature comprised of an increasing frequency of lines (perhaps viewable only at an acute angle) would play a tone represented by the line structure. The user would be the ultimate arbiter of whether the correct signal was produced.

Sample cell phones that are suited for use with the presently-detailed technology include the Sprint PPC-6700 pocket PC, and the Cingular 8525 smart phone. The former (manufactured by HTC) runs Microsoft Windows Mobile 5.0 on a 416 MHz processor, with 64 megs of RAM, 128 megs of flash ROM, a mini-SD card, a 1.3 megapixel camera (including a selectable macro lens), and a 2.8" QVGA display, together with Bluetooth and EDVO data interfaces (as well as the cellular interfaces). The latter (also made by HTC) likewise is equipped with the Microsoft Windows Mobile 5.0 operating system, but runs on a 400 MHz Samsung SC32442A processor, again with 64 megs of RAM and 128 megs of flash ROM. The camera is 2 megapixels. The Cingular device also has a 2.8" QVGA display screen, but with an ATI Imageon 2282 graphics processor, and provides GPRS, EDGE, UMTS and HSDPA data interfaces. The Apple iPhone is also suitable. Further details and specifications of these cell phones are readily available and are familiar to the artisan.

One particular method according to the foregoing comprises capturing image data corresponding to a field of view that encompasses at least part of an object bearing steganographic encoding (using, e.g., a 2D optical sensor and associated lens arrangement); detecting the steganographic encoding; and, as a consequence of the detected steganographic encoding, presenting a graphic feature on the display together with at least some of said image data.

The cell phone may include plural buttons, and the graphic feature presented on the display can aid a user in operating said buttons in furtherance of an objective.

If the location of the object within the field of view changes, the method can include similarly changing the position on said display at which the feature is presented.

By reference to the steganographic encoding, affine distortion of the object as represented in the image data can be at least partially characterized. A warped graphic feature that is similarly affine-distorted can then be generated, and presented on the display. The graphic feature can further be presented in spatial registration with the object on the display.

The method can further include decoding auxiliary data represented by the steganographic encoding; indexing a data store based—at least in part—on the decoded auxiliary data; executing a procedure based—at least in part—on data indexed in the data store (which procedure causes the graphic feature to be presented on the cell phone display; wherein the feature is presented on the display in a location related to the location of the watermarked object within the field of view.

The decoding of the watermark data, the calculation of a fingerprint, and/or other of the detailed processing operations can be performed by the cell phone processor. Or, the input data can be transmitted to a remote device, which can then perform the needed processing and—where appropriate—transfer information back to the cell phone. Hybrid arrangements, in which the processing is distributed among the cell phone processor and the remote processor, may also be employed.

It will be recognized that while the just-detailed arrangements employ a display as an output device, it should be recognized that other output mechanisms and devices can be employed, e.g., audio transducers, tactile and force-feedback transducers, scent synthesizers, etc.

To provide a comprehensive disclosure without unduly lengthening this specification, applicants incorporate by reference each of the patents, applications and documents referenced herein. (Although sometimes noted above in connection with specified teachings, these references are incorporated in their entireties, including for other teachings.) Teachings from such documents can be employed in conjunction with the presently-described technology, and aspects of the presently-described technology can be incorporated into the methods and systems described in those documents.

In view of the wide variety of embodiments to which the principles and features discussed above can be applied, it should be apparent that the detailed arrangements are illustrative only and should not be taken as limiting the scope of this technology. Rather, we claim all such embodiments as come within the scope and spirit of the following claims and equivalents thereto.

We claim:

1. A method comprising:
    generating image data using an optical system that comprises a two-dimensional image sensor and a lens;
    capturing the image data corresponding to a field of view that encompasses at least part of an object;
    computing fingerprint data from image data corresponding to the object;
    determining registration data based on the fingerprint data;
    obtaining additional data based on the computed fingerprint data; and
    presenting a combined display, wherein the combined display comprises at least some of the captured image data and graphical indicia corresponding to the obtained additional data, wherein the graphical indicia is registered to the at least some of the captured image data based on the registration data.

2. The method of claim 1, further comprising detecting an affine distortion of the object as represented in the image data, wherein the computed fingerprint data is based in part on the detected affine distortion.

3. The method of claim 1, further comprising:
    detecting an affine distortion of the object as represented in the image data; and
    applying a corresponding affine distortion to the graphical indicia presented on the screen.

4. The method of claim 1, wherein the object comprises a printed medium.

5. The method of claim 1, wherein the object has a first location within the field of view, and wherein the presenting comprises presenting the graphical indicia on the combined display in a location dependent on the first location.

6. A portable device comprising:
    a display system;
    an optical system comprising a two-dimensional image sensor and a lens configured to generate image data;
    a processor configured to:
        derive corresponding image fingerprint data from the image data; and
        determine registration data based on the fingerprint data;
    a wireless interface configured to transmit the fingerprint data and to receive corresponding metadata in reply, wherein the display system is configured to present on a screen a combined display, wherein the combined display comprises at least some of the image data and graphical indicia corresponding to the received metadata, and wherein the graphical indicia is displayed on the screen in a location that depends on position of an object feature within a field of view of the optical system.

7. A non-transitory computer-readable medium having instructions stored thereon that, if executed by a computing device, cause the computing device to perform operations comprising:

generating image data using an optical system that comprises a two-dimensional image sensor and a lens;

capturing the image data corresponding to a field of view that encompasses at least part of an object;

computing fingerprint data from image data corresponding to the object;

determining registration data based on the fingerprint data;

obtaining additional data based on the computed fingerprint data; and presenting a combined display, wherein the combined display comprises at least some of the captured image data and graphical indicia corresponding to the obtained additional data, wherein the graphical indicia is registered to the at least some of the captured image data based on the registration data.

8. The computer-readable medium of claim 7, wherein the operations further comprise detecting an affine distortion of the object as represented in the image data, and wherein the computed fingerprint data is based in part on the detected affine distortion.

9. The computer-readable medium of claim 7, wherein the operations further comprise:

detecting an affine distortion of the object as represented in the image data; and applying a corresponding affine distortion to the graphical indicia presented on the screen.

10. The computer-readable medium of claim 7, wherein the object comprises a printed medium.

11. The computer-readable medium of claim 7, wherein the object has a first location within the field of view, and wherein the presenting comprises presenting the graphical indicia on the combined display in a location dependent on the first location.

12. The portable device of claim 6, wherein the processor is further configured to detect an affine distortion of the object as represented in the image data, and wherein the computed fingerprint data is based in part on the detected affine distortion.

13. The portable device of claim 6, wherein the processor is further configured to:

detect an affine distortion of the object as represented in the image data; and apply a corresponding affine distortion to the graphical indicia presented on the screen.

14. The portable device of claim 6, wherein the object comprises a printed medium.

15. The portable device of claim 6, wherein the object has a first location within the field of view, and wherein the processor is further configured to present the graphical indicia on the combined display in a location dependent on the first location.

* * * * *

UNITED STATES PATENT AND TRADEMARK OFFICE
CERTIFICATE OF CORRECTION

| | | Page 1 of 1 |
|---|---|---|
| PATENT NO. | : 8,565,815 B2 | |
| APPLICATION NO. | : 11/941268 | |
| DATED | : October 22, 2013 | |
| INVENTOR(S) | : Rhoads et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1338 days.

Signed and Sealed this
Seventh Day of April, 2015

Michelle K. Lee
*Director of the United States Patent and Trademark Office*